(12) United States Patent
Zhang et al.

(10) Patent No.: US 9,172,651 B2
(45) Date of Patent: Oct. 27, 2015

(54) DENIAL OF SERVICE PREVENTION IN A SOFTWARE DEFINED NETWORK

(71) Applicant: Telefonaktiebolaget L M Ericsson (publ), Stockholm (SE)

(72) Inventors: Ying Zhang, Fremont, CA (US); Ravi Manghirmalani, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 62 days.

(21) Appl. No.: 14/181,347

(22) Filed: Feb. 14, 2014

(65) Prior Publication Data

US 2015/0236968 A1    Aug. 20, 2015

(51) Int. Cl.
| | | |
|---|---|---|
| H04W 4/00 | (2009.01) | |
| H04L 12/823 | (2013.01) | |
| H04L 12/721 | (2013.01) | |
| H04L 12/26 | (2006.01) | |
| H04L 29/06 | (2006.01) | |

(52) U.S. Cl.
CPC ............ *H04L 47/32* (2013.01); *H04L 43/0894* (2013.01); *H04L 43/16* (2013.01); *H04L 45/124* (2013.01); *H04L 63/1458* (2013.01)

(58) Field of Classification Search
CPC ........................................................ H04L 47/10
USPC ........................................................ 370/230
See application file for complete search history.

(56) References Cited

U.S. PATENT DOCUMENTS

2013/0329734 A1* 12/2013 Chesla et al. ................. 370/392
2014/0229945 A1*  8/2014 Barkai et al. ...................... 718/1

OTHER PUBLICATIONS

McKeown, et al., "*OpenFlow: Enabling Innovation in Campus Networks*," SIGCOMM, Mar. 14, 2008, 6 pages.
'OpenFlow Switch Specification,' Version 1.10 Implemented (Wire Protocol 0x02), OpenFlow1.1 'http://www.openflow.org/wk/index.php/OpenFlow_v1.1,' Feb. 28, 2011, 56 pages.
Huang, et al., "*Communication-Efficient Tracking of Distributed Cumulative Triggers*", 27th International Conference on Distributed Computing Systems (ICDCS'07). Toronto, Canada, Jun. 2007. 10 pages.
Claise, et al., '*Specification of the IP Flow Information Export (IPFIX) Protocol for the Exchange of Flow Information*,' Internet Engineering Task Force (IETF), RFC 7011. Sep. 2013. 76 pages.
Sandra Scott-Hayward et al., "SDN Security: A Survey," Nov. 11, 2013, pp. 1-7, 2013 IEEE SDN for Future Networks and Services, IEEE.

* cited by examiner

*Primary Examiner* — Samina Choudhry
(74) *Attorney, Agent, or Firm* — Nicholson De Vos Webster & Elliot, LLP

(57) ABSTRACT

A method in a controller module is described for allocating rate-limiting meters to a plurality of network elements (NEs) of a software defined network (SDN). The method includes receiving a plurality of rate limit indicators, from one or more network destinations, for a plurality of flows of data that arrive at the network destinations; sending one or more meter installation messages to cause a plurality of meter entries corresponding to the plurality of rate limit indicators to be installed by one or more of the NEs according to a metering configuration that is determined by, for each of the flows, selecting a flow of the plurality of flows that has not been selected yet and that traverses a path in the SDN having a fewest number of the plurality of NEs, and selecting a NE from the path that the selected flow traverses to have a meter entry installed.

21 Claims, 10 Drawing Sheets

400

| Algorithm 1 Meter assignment algorithm |
| --- |
| procedure *Basic_Task_Assignment(G,F,R,N)* |

404 → for each flow $f \in F$ do
408 →    Gather all switches in G that can cover $f$, denoted as $S^f$
410 →    for each switch $s \in S^f$ do
412 →       Increase flow covering count $C_s++$.
414 →    end for
416 →    the total number of switches covering $f$ is denoted as $|S^f|$
418 → end for
420 → sort $F$ according to $|S^f|$ ascending, store the new list of $F$ to $SF$
422 → for every flow $f \in SF$ do
424 →    for every switch $s \in S^f$ do
426 →       select s' with largest $N_s - C_s$ value
428 →    end for
430 →    assign meter of $f$ to switch $s'$
432 →    $N_s--$;
434 → end for

FIG. 4

DENIAL OF SERVICE PREVENTION IN A SOFTWARE DEFINED NETWORK

FIELD

Embodiments of the invention relate to the field of networking; and more specifically, to Denial-of-Service attack prevention in Software Defined Networks.

BACKGROUND

An insidious aspect of the Internet model is that receivers of data have no control over the resources consumed on their behalf: a host can receive a repetitive stream of packets regardless of whether they are desired. Denial-of-Service (DoS) attacks, which exploit this feature of the Internet model, are now a prominent issue due to their ability to disrupt services and communication infrastructure. A DoS attack consumes the resources of a remote host and/or network in an effort to deny the use of those resources to legitimate users. For example, a flooding DoS attack may inundate a victim with so much additional malicious traffic that its network connection or its servers become saturated. The result is a network and/or end-system that is no longer able to respond to normal requests in a timely manner, effectively disabling the service. A variety of DoS attack techniques exist that exploit existing software flaws to cause remote hosts to either crash or significantly degrade in performance. Either upgrading faulty software or filtering particular packet sequences can sometimes prevent such attacks.

In some cases, a single host carrying out a flooding DoS attack can have a devastating effect on a victim. Even more damaging is an attack that is amplified by the use of multiple hosts to launch a coordinated attack against a single victim. This type of attack is called a Distributed Denial of Service (DDoS) attack.

DDoS attacks pose an immense threat to the Internet, and many defense mechanisms have been proposed to combat the problem. However, attackers constantly modify their tools to bypass these security systems, and researchers in turn need to modify their approaches to handle new attacks.

Early work in the area of DoS (and DDoS) attack mitigation sought to make all sources of traffic identifiable, e.g., ingress filtering discards packets with widely spoofed addresses at the edge of the network, and traceback involves maintaining state so that receivers can reconstruct the path of unwanted traffic.

Although DDoS attacks can sometimes have predictable effects, it is still difficult to mitigate them. One group of methods is on establishing a framework so that the attack cannot block legitimate users from accessing resources. These techniques may include authorizing only legitimate users to access protected servers and applying packet filters in routers to drop spoofed Internet Protocol (IP) packets.

A different tactic is to configure a network to limit communication to previously established patterns, e.g., by giving legitimate hosts an offline authenticator that permits these hosts to send to specific destinations. However, this approach does not protect public servers (e.g., www.google.com) that are in general unable to arrange an offline authenticator for legitimate senders prior to communication.

Another solution is to limit host communication patterns to client-server communication only by separating client and server address spaces. The network does not permit any inter-host communication by default, unless a destination explicitly requests to receive from a sender. Both solutions limit DoS attacks to private end hosts, but require additional mechanisms to protect open public servers.

Yet a further solution is to use a DoS prevention and mitigation scrubber box, which integrates complex functionality to detect and mitigate DoS attacks to a network destination. However, such solutions typically lack programmability since the scrubber box is a "black box." This scrubber box also sits at only one location at the network and therefore may introduce additional overhead in the network.

A recent network architecture proposal has drawn significant interests from both academia and industry. In this new architecture, the control plane is decoupled from the forwarding plane and the entire router is built as a distributed system. Such a system may be referred to as a Software Defined Network (SDN). A SDN includes a network-wide control platform, running on one or more servers, which oversees a set of comparatively simple switches or network elements. However, there is currently no method of performing DDoS prevention or mitigation in SDNs.

SUMMARY

According to an embodiment, a method in a controller module of a computing device for allocating rate-limiting meters to a plurality of network elements of a software defined network (SDN), wherein the controller module acts as a controller of the SDN, is described. The method includes receiving a plurality of rate limit indicators, from one or more network destinations, for a plurality of flows of data that arrive at the one or more network destinations. Each of the plurality of rate limit indicators indicates a maximum throughput of traffic of a corresponding one of the plurality of flows that a corresponding network destination is prepared to accept. The method further includes sending one or more meter installation messages to cause a plurality of meter entries corresponding to the plurality of rate limit indicators to be installed by one or more of the plurality of network elements according to a metering configuration. The controller module determines the metering configuration by, for each of the plurality of flows, selecting a flow of the plurality of flows that has not been selected yet and that traverses a path in the SDN having a fewest number of the plurality of network elements, and selecting a network element from the path that the selected flow traverses to have a meter entry installed. The selecting is based upon a number of empty meter entry slots of that network element and a total number of flows that traverse that network element. The meter entry is to cause the selected network element to limit the traffic of the selected flow according to a rate limit indicator corresponding to the selected flow.

According to an embodiment, a software defined networking (SDN) controller apparatus to be coupled to a plurality of network elements of a SDN and configured to allocate rate-limiting meters to the plurality of network elements is described. The SDN controller includes a policy store to store a plurality of rate limit indicators for a plurality flows of data to be received from one or more network destinations in the SDN. Each of the plurality of rate limit indicators indicates a maximum throughput of traffic of a corresponding one of the plurality of flows that a corresponding network destination is prepared to accept. The SDN controller also includes a meter entry distribution module to send one or more meter installation messages to cause one or more of the plurality of network elements to install a plurality of meter entries corresponding to the plurality of rate limit indicators in accordance with a metering configuration. To determine the metering configuration, for each of the plurality of flows, the meter entry distribution module is configured to, select a flow of the plurality of flows that has not been selected yet and that traverses a path in the SDN having a fewest number of the plurality of network elements, and select a network element from the path that the selected flow traverses to have a meter entry installed. The selection is based upon a number of empty meter entry slots of that network element and a total number of flows that traverse that network element, and wherein the meter entry is to cause the selected network element to limit the traffic of the selected flow according to a rate limit indicator corresponding to the selected flow.

According to an embodiment, a system that supports allocating rate-limiting meters to a plurality of network elements is described. The system includes a plurality of network elements of a software defined network (SDN). Each network element includes a flow table that stores one or more rules governing one or more flows traversing the one of the plurality of network elements. Each network element also includes a meter module having a meter table that stores one or more meter entries each including a rate limit indicator. Each rate limit indicator indicates a maximum throughput of traffic that a corresponding network destination is prepared to accept for a corresponding one of the one or more flows traversing through the one of the plurality of network elements. The meter table has a limited capacity to store meter entries. The one or more meters correspond to the one or more meter entries in the meter table. Each meter limits the throughput of traffic of a corresponding flow according to the rate limit indicator of the corresponding meter entry. The system also includes a controller coupled to the plurality of network elements in the SDN that allocates rate-limiting meters to the plurality of network elements in the SDN. The controller includes a policy store that stores a plurality of rate limit indicators for a plurality of flows that are received from one or more network destinations in the SDN. The controller also includes a meter entry distribution module that sends one or more meter installation messages to cause one or more of the plurality of network elements to install a plurality of meter entries corresponding to the plurality of rate limit indicators in accordance with a metering configuration. To determine the metering configuration, for each of the plurality of flows, the meter entry distribution module selects a flow of the plurality of flows that has not been selected yet and that traverses a path in the SDN having a fewest number of the plurality of network elements, and selects a network element from the path that the selected flow traverses to have a meter entry installed. The selecting is based upon a number of empty meter entry slots of that network element and a total number of flows that traverse that network element, and wherein the meter entry is to cause the selected network element to limit the traffic of the selected flow according to the rate limit indicator corresponding to the selected flow.

Embodiments of this invention propose a new method for providing a DDoS prevention services using a light-weight, scalable approach. It allows the customer to submit the requests to the SDN controller. The SDN controller can then set up the meters in the network in a scalable way so that the total overhead to the flow table on the network elements is minimized. An advantage is that it does not require complex and heavy computations on both the control and the forwarding plane.

BRIEF DESCRIPTION OF THE DRAWINGS

The invention may best be understood by referring to the following description and accompanying drawings that are used to illustrate embodiments of the invention. In the drawings:

FIG. 4 illustrates a procedure for an exemplary metering configuring 250 executed by the SDN controller 152 according to an embodiment of the invention.

DESCRIPTION OF EMBODIMENTS

Figure 1:
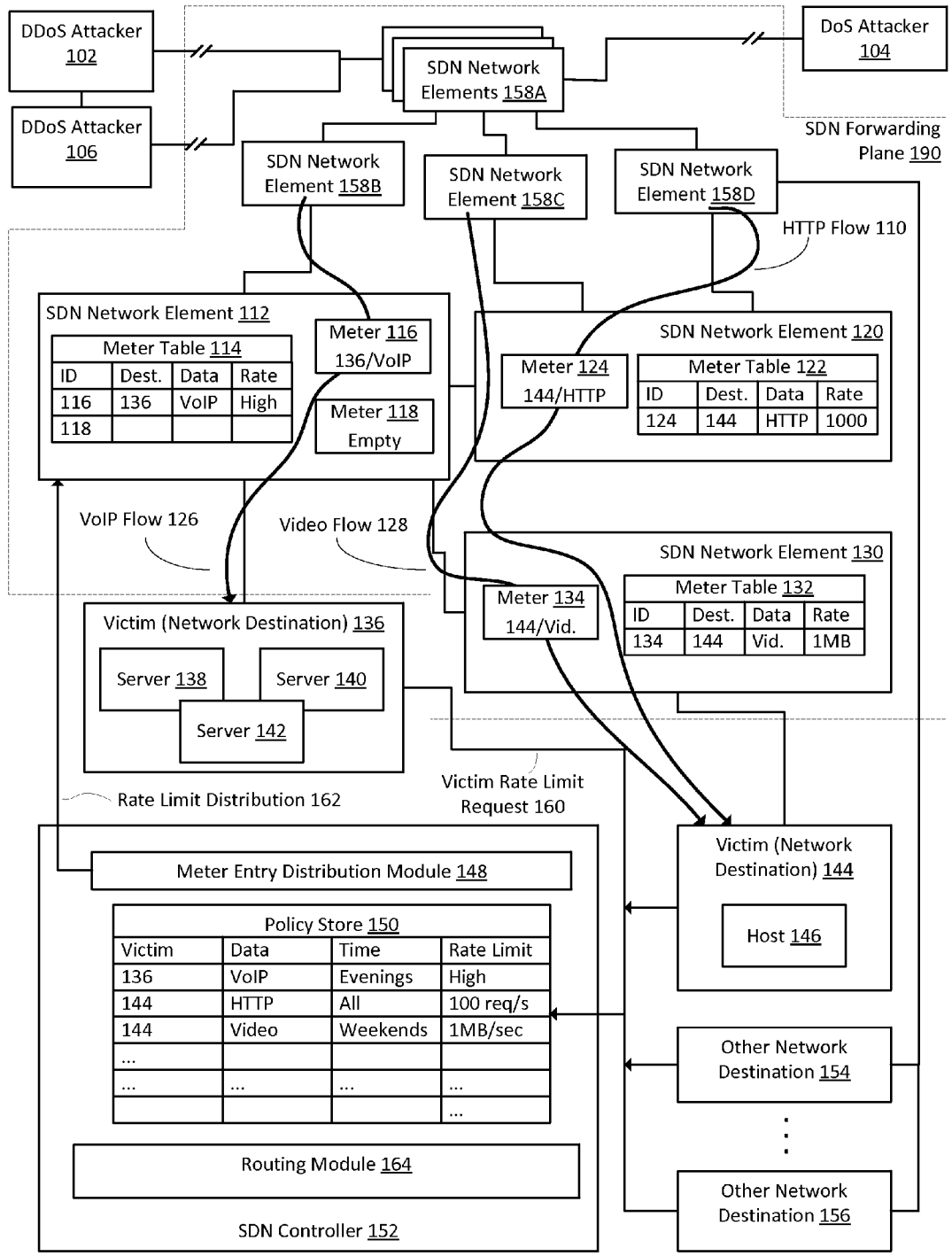
FIG. 1 illustrates an exemplary mode of the invention in an exemplary network, according to an embodiment of the invention.

The following description describes methods and apparatus for Denial of Service Prevention in a Software Defined Network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A software defined network (SDN) includes a network-wide control platform, running on one or more servers in the network, overseeing a set of simple switches or network elements. In this new architecture, the control plane is decoupled from the forwarding plane and the entire router is built as a distributed system. The SDN comprises multiple network elements, interconnecting with each other and a small number of controllers that control the forwarding behavior of these network elements.

The SDN controller adds and removes flow entries from the flow table of SDN network elements. A function of the SDN controller is to cause the network elements to install rules in their respective forwarding database to define how data is forwarded between the network elements. In some cases, it also handles network state distribution, such as col-lecting information from the network elements and distribut-ing routing instructions to them. It can also be programmed to support any new addressing, routing, and complex packet processing applications.

As used here, a network element (also known as a switch or forwarding element) communicatively interconnects other equipment on the network (e.g., other network elements, end stations). In some embodiments, network elements provide support for multiple networking functions (e.g., routing, bridging, switching, Layer 2 aggregation, session border con-trol, Quality of Service, and/or subscriber management), and/or provide support for multiple application services (e.g., data, voice, and video).

One task of a network element is to forward packets from an incoming network interface to an outgoing network inter-face, according to the rules in the flow table of the network element as programmed by the SDN controller. Each flow entry in the flow table may contain a set of actions such as forwarding packets to a given port, modifying certain bits in the packet header, or encapsulating packets to the controller, or simply dropping the packets. For the first packet in a new flow, the network element may forward the packet to the controller to trigger the new flow entry being programmed for that new flow.

In an embodiment, a network element also includes meters which are able to control the throughput rate of traffic passing through the network element based on various meter entries in a meter table. Some of the information within the meter entries may be provided by the SDN controller.

As used herein, a network destination, also known as a victim or target system, comprises one or more destination addresses on the network and the devices on the network represented by these addresses. For example, a network des-tination may refer to a single end station. Alternatively, a network destination may refer to a group of devices, such as a group of servers, with each device having its own network address. In some embodiments, the network destination refers to the addresses of a plurality of virtual devices, with each virtual device being uniquely addressable.

An electronic device, such as parts or the whole of the SDN controller, the SDN network element, or the network desti-nation, stores and transmits (internally and/or with other elec-tronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmis-sion media (e.g., electrical, optical, acoustical or other form of propagated signals—such as carrier waves, infrared sig-nals). Thus, an electronic device (e.g., a computer) includes hardware and software, such as a set of one or more proces-sors coupled to one or more non-transitory machine-readable storage media (to store code for execution on the set of pro-cessors and data) and a set or one or more physical network interface(s) to establish network connections (to transmit code and/or data using propagating signals). One or more parts of an embodiment of the invention may be implemented using different combinations of software, firmware, and/or hardware.

DDoS prevention is important for enterprises and ISP operators. However, there are no effective DDoS prevention techniques yet available for SDNs. As many SDN's use net-work elements with limited functions, implementing DDoS prevention in an SDN becomes a challenge due to this limited functionality. According to an embodiment of the invention, the metering capabilities of SDN network elements are uti-lized to achieve powerful network-wide DDoS prevention. In this embodiment, a network destination requests protection from a DDoS attack by submitting to the SDN controller an indication of a maximum traffic rate it can accept. In addition, the network destination can also submit information regard-ing different traffic rates for different sources that it can accept (e.g., the network destination can specify the traffic rates for different flows that it can accept). Based on this information, the SDN controller proactively causes meters to be configured on the SDN network elements to rate limit the traffic volume to each network destination in a distributed way. The meters impose rate limiting to all the flows destined to the victim. In an embodiment the network destination requires a different rate limit setting for different sources, i.e., different rates of traffic from different flows, and instead of installing one rule for all the flows towards one single desti-nation, the SDN controller can separate the single rule to a number of detailed rules so that it can have finer-grained control on flows destined to the same network destination.

According to an embodiment of the invention, such a sys-tem is implemented in a scalable way. In some embodiments, meters can be allocated intelligently for a single network destination by installing meters in such a manner as to intro-duce as little overhead as possible to the network. In some embodiments, meters can be allocated for multiple network destinations by installing meters at particular SDN network elements intelligently to ensure a globally optimal solution.

FIG. 1 illustrates an exemplary system of the invention in an exemplary network, according to some embodiments of the invention. Three SDN network elements, 112, 120, and 130 are depicted in detail to describe how meters are allocated for the two network destinations 136 and 144. However, this does not indicate that the system is limited to such a configu-ration of SDN network elements and network destinations. The system can support an arbitrary number of SDN network elements and network destinations.

Initially, the network destinations 136 and 144 provide to the SDN controller 152 information about traffic arriving at the network destination. In some embodiments, this information is provided proactively before any potential DDoS attack. In some embodiments, this information is provided in reaction to an attack. The network destinations provide this information by sending rate limit requests 160. The SDN controller 152 receives the rate limit requests 160, optionally processes the requests, and places the requests in a policy store 150. The policy store 150 stores the various rate limit information and/or other data submitted by each network destination. As shown in an exemplary format in the policy store 150, a rate limit request 160 for a particular victim/network destination, e.g. 136 and 144, may include information such as the type of data of a particular flow to be rate limited (e.g., Voice over IP (VoIP), Hypertext Transfer Protocol (HTTP)) the time of day, month, year, or other schedule during which the rate limit should be enforced, and the rate limit itself, which may comprise a set value indicating a throughput of traffic (e.g., 1 megabyte (MB)/sec, 2 packets/sec) or a general priority, bucket, or category specification (e.g., high priority, lowest/bulk priority), or any other method of indicating a rate of traffic (e.g. requests/second). This rate entry in the policy store may be for the entire amount of traffic (i.e., total throughput) arriving at the network destination, or for individualized flows of traffic, or for individual packets, or any other categorization of data arriving at the network destination.

Once the SDN controller 152 receives the rate limit information from the network destinations, it distributes the rate limit entries in the policy table 150 to the various SDN network elements in the network, e.g. 112, 120, 130, in an optimal manner. Each SDN network element has a limited capacity of meters (e.g. meter 116). These meters limit the traffic throughputs of flows matching criteria defined by, or associated with, the meters. In an embodiment, each meter of a network element controls the traffic of a flow according to a rate limit entry in the policy table 150 once the rate limit entry is configured and installed as a meter entry in a meter table (e.g. 114, 122, and 132) of the respective network element. In this embodiment, the rate limit entries are distributed optimally among the network elements based on the remaining meter entry capacity of each meter and how many flows traverse each meter. This allows a maximum number of rate limit entries to be accepted by the network and even in the case where each SDN network element in the SDN has a very large meter capacity, the rate limit entries are distributed more evenly across the network, reducing overhead and burden on each individual network element. In some embodiments, the SDN controller 152 distributes the information within the rate limit entries of the policy table 150 to the meters via the meter entry distribution module 148.

The rate limit requests 160 may not arrive at the same time at the SDN controller 152. In some embodiments, in response to such a situation, the SDN controller 152 restarts the distribution of the rate limit entries to the network elements from an initial clean state, as if no entries have been distributed at all. The existing entries are caused to be removed from the network elements by one or more messages sent to the network elements by the SDN controller and all the existing and new entries are newly placed on the network elements. In some embodiments, the SDN controller distributes the new entries according to the same distribution scheme used for the existing entries, but does not change the existing entries, i.e., the SDN controller distributes the new entries without accounting for the existing entries.

The number of rate limit requests may exceed the remaining capacity of all SDN network elements in the SDN. In some embodiments, in response to such a situation, the SDN controller 152 automatically prioritizes the distribution of the rate limit entries to the various network elements according to automatic heuristics which may be based upon the amount of data each of the network destinations can receive, the type of flow being limited, etc. In some embodiments, the SDN controller 152 distributes the rate limit entries to the remaining empty meter slots based upon a previously created priority list. In some embodiments, the SDN controller 152 alerts another (e.g., a northbound) system or user about the issue and asks for how to proceed.

The number of rate limit requests for a single network destination may exceed the meter capacity of all the network elements that can meter the flows arriving at that network destination. In some embodiments, in response to this situation, the SDN controller 152 alerts the network destination about the error and asks the network destination for a reduced number of rate limit requests according to the capacity of the network elements. In some embodiments, the SDN controller 152 automatically prioritizes which of the rate limit entries for that single network destination are distributed. In some embodiments, an alert is generated for another system or user.

There may be many ways in which the SDN controller 152 is provided with rate limit requests. In some embodiments, some or all of the rate limit requests do not arrive from each individual network destination or victim, but instead are configured by another system or user, e.g. a northbound system or a management plane. In some embodiments, a network destination sends the rate limit requests to the SDN controller automatically in response to detecting a possible DDoS attack. In some embodiments, a user at the network destination configures the rate limit requests to the SDN controller. In some embodiments, the SDN controller 152 automatically generates rate limit entries for installation in to the empty meter slots of the network destinations based upon detecting a DDoS attack to that network destination.

As noted previously, a network destination as used here comprises one or more destination addresses on the network and the devices on the network represented by these addresses. For example, a network destination could refer to the single destination address 144 of a host 146. A network destination may also refer to the destination addresses of a group of computing devices, such as servers 138-142 at network destination 136.

Three flows are depicted in FIG. 1. While FIG. 1 only depicts three flows, the process described here can be applied to a network with an arbitrary number of flows. In FIG. 1, network destination 136 receives one flow, the VoIP flow 126, while network destination 144 receives two flows, the video flow 128 and the HTTP flow 110. These flows or other flows may be utilized by a single attacker such as DoS attacker 104, or by a distributed set of attackers, such as DDoS attackers 102 and 106. These attackers send a flood of unwanted traffic through the network to the network destinations. The network is represented by SDN network elements 158A (which represents one or more network elements), network elements 158B-D, and SDN network elements 112, 120, and 130. In an embodiment, these network elements reside in the SDN forwarding plane 190 (outlined by the dotted line), which represents the portion of the network which interconnects the various network destinations in the network. As described previously, in an embodiment, the network destinations have sent rate limit requests 162 to the SDN controller 152, which distributes the rate limit requests among the various network elements, causing the network elements to install meter entries based upon the rate limit requests.

As depicted in FIG. 1, flow 126 only passes through network element 112, and thus the rate limit entry for 126 is distributed to 112, which installs this entry into its meter table 114, and assigns meter 116 to the flow. Flow 128 traverses through network elements 120, 112, and 130 to arrive at network destination 144. Flow 110 arrives at network element 120 through a different port, but also traverses through network elements 112 and 130. In a naïve approach to distributing the rate limit information in the rate limit entries to these network elements, all the rate limit information may be distributed to network element 112, where meter entries are installed to cover all of the flows corresponding to the rate limit entries. However, in this naïve approach, network element 112 would have run out of capacity to store the meter entry corresponding to the rate limit information for flow 126, and thus the network would not be able to rate limit flow 126 arriving at network destination 136, as no other network element is able to meter that flow in the depicted network. Thus, a sub-optimal solution would have been reached using this naïve approach.

Instead, in an embodiment, the rate limit information for flows 110 and 128 are intelligently distributed to network elements 120 and 130, respectively. In this embodiment, unlike the naïve approach, network element 112 still has capacity for a meter entry for flow 126.

Once the meter entries corresponding to the rate limit entries are installed on the network elements, in an embodiment, the network elements use meters installed on the network elements to meter the particular flow associated with the meter entry. Each network element has a total number of meters equal to the total meter entry capacity available to the network element. In an embodiment, the meters (e.g., meter 116) are separate hardware devices within the network element. In other embodiments, the meters are a combination of hardware and software.

The meters change the traffic of their assigned flows according to their respective meter table entry. For example, meter 116 is assigned flow 126. As depicted, the meter entry for flow 126, which is in meter table 114, states that the rate for VoIP traffic is "High." In response to this rate information, the meter 116 may shape the VoIP traffic flow 126 in a variety of ways. For example, the "High" rate may instruct meter 116 to limit VoIP traffic in flow 126 only when it reaches a very high rate. This rate may be configured in a variety of ways, including but not limited to being determined by a previous policy, by an automatic statistical analysis of traffic in the network, or by a determination of the respective network destination's traffic capabilities. As another example, the "High" rate may indicate to the meter 116 to allow the VoIP flow 126 through unfettered and to rate limit non-VoIP traffic if that non-VoIP traffic causes congestion or conflicts with the VoIP traffic, such that the VoIP traffic cannot be maintained at the "High" level. If, for example, a DDoS attacker attempts to send a large stream of traffic, and that traffic is not of the type of traffic which the meter expects, e.g. VoIP traffic, the meter limits that other traffic, either by dropping some or all of it or by subjecting it to some other limiting process known to those of skill in the art, to preserve the traffic flow of the VoIP traffic.

Furthermore, in this depiction, the meter entry for the VoIP flow 126 is associated with a rate limit that is only active during evenings, as set by the time setting within the policy store 150 of the SDN controller 152. In an embodiment, the SDN controller 152 causes the meter entry for the VoIP flow 126 to be removed from the meter table 114 (or made "inactive") when the time is not within a range defined as "Evenings." In an embodiment, the meter does not enforce the meter entry for the VoIP flow 126 when the time is not with "Evenings". In some embodiments, the time entry defines a time of enforcement using any combination of schedules or indicators that the meter can use to interpret a time schedule.

As depicted, meter 124 is assigned to flow 110 and is configured to meter HTTP traffic. The rate assigned is "100 req/sec." As with meter 116, this rate indication may instruct meter 124 to meter flow 110 in a variety of ways. For example, this may instruct the meter to allow only 100 HTTP requests per second to be passed through to the network destination 144. As another example, this may instruct the meter to allow at least 100 HTTP requests to always be transmitted to the network destination 144 and to drop non-HTTP request packets if needed to achieve this rate.

As depicted, meter 134 is assigned to flow 128 and is configured to meter video traffic (e.g., streaming video). The rate assigned is "1 MB/sec". As with meters 116 and 124, this rate indication may instruct meter 134 to meter flow 128 in a variety of ways. For example, this may instruct meter 134 to limit the flow of video traffic to network destination 144 to 1 MB/sec. As another example, this rate may indicate to meter 134 to allow at least 1 MB/sec of video traffic to network destination 144.

The network as depicted in FIG. 1 is not limited to these elements as described. For example, the network may include additional SDN network elements 158A and/or additional network destinations, such as network destinations 154-156. The network may also use an additional SDN controller linked with SDN controller 152 to control the network. Note also that while the above description is made primarily with respect to SDNs, the system can be used in many types of networks, such as a traditional network with network elements that include both a control plane and a forwarding plane, a mobile network, or any other type of network.

Figure 2:
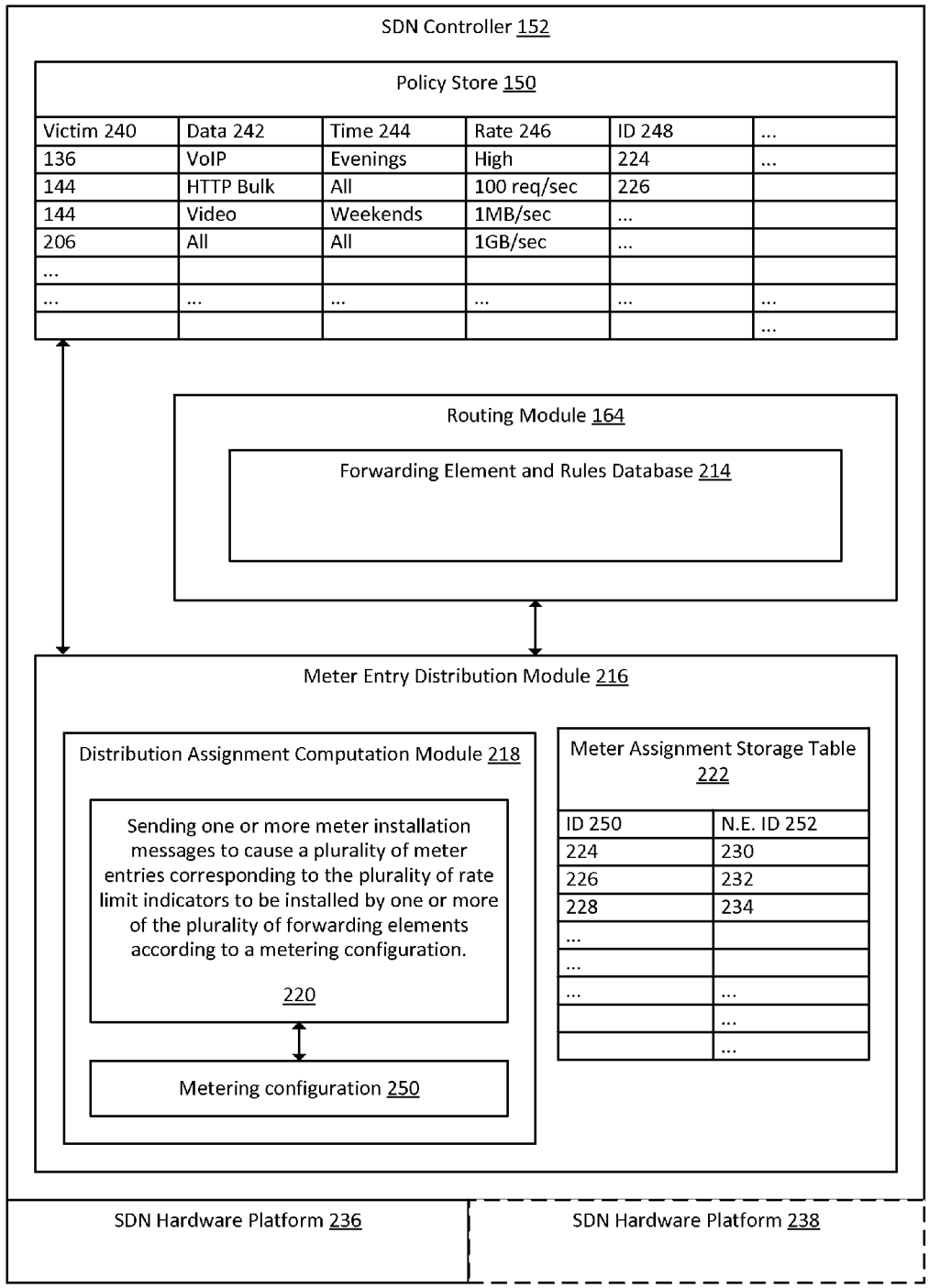
FIG. 2 is a block diagram illustrating an exemplary SDN controller 152 according to an embodiment of the invention.

FIG. 2 is a block diagram illustrating an exemplary SDN controller 152 according to some embodiments of the invention. In an embodiment, the SDN controller 152 receives rate limit requests 160 from network destinations and places these entries or converts these entries for placement into the policy store 150 as rate limit entries. In an embodiment, the policy store includes at least a victim identifier (ID) 240, a data type 242, a time of enforcement 244, a rate indicator 246, and a rate limit entry ID 248. The SDN controller 152 distributes the rate limit information in the policy stores to the various network elements in the SDN to cause the network elements to install meter entries corresponding to these rate limit entries. In some embodiments, this distribution is done by the meter entry distribution module 216.

As described previously, the rate limit entries are defined by the network destination, type of data in the flow, time, and rate. In an embodiment, the rate indicator 246 can also define the rate for the entire throughput of the network destination. For example, as depicted, network destination 206 has requested a rate limit of 1 gigabyte (GB)/sec for all data arriving at that network destination during all time periods. Thus, a meter enforcing such a rate limit entry would discard any traffic exceeding this 1 GB/sec limit.

In some embodiments, the meter entry distribution module 216 includes a distribution assignment computation module 218. This module, as described in 220, determines which network element should install which meter entry corresponding to which rate limit entry, according to a metering configuration 250. This metering configuration, as described previously, is a configuration which distributes the rate limit information optimally to reduce load on the network and to ensure that the most number of network destinations have their rate requests honored.

In some embodiments, to keep track of which rate limit entry is assigned to which network element, the meter entry distribution module 216 includes a meter assignment storage table 222 to store these assignments. For example, in the depicted table, the rate limit entry 224 (under the column 250) corresponding to network destination 136 and the VoIP flow is assigned to a network element ID of 230 (under the column 252). In other embodiments, the meter entry distribution module is stateless and does not need to keep track of these assignments as it reassigns all the rate limit entries each time a new update of the entries is required and thus does not need to know of which entries were previously assigned.

In some embodiments, the SDN controller 152 resides on an SDN hardware platform 236. This hardware platform may include commercial off-the-shelf ("COTS") hardware, or specialized hardware designed to run the SDN controller process(es). This hardware platform 236 may also execute other processes, and the SDN controller 152 may be a virtualized process running on the platform. In some embodiments, two separate hardware platforms, 236 and 238, are configured to execute the SDN controller 152. For example, if the network is large and network latencies or other factors render a single hardware platform for the SDN controller 152 to be inadequate, then two (or more) hardware platforms may be used and that communicate with each other in such a way to form one logical SDN controller.

In some embodiments, the SDN controller 152 also includes a routing module 164 and forwarding database 214 to perform various routing functions related to the network and for the network elements in the network. This routing module may send messages to the SDN network elements to cause the network elements to install rules in their flow tables. The rules may contain a set of actions such as forwarding packets to a given network interface, modifying bits in an incoming packet, encapsulating packets to send to the SDN controller 152, or dropping the packets, etc.

Figure 3:
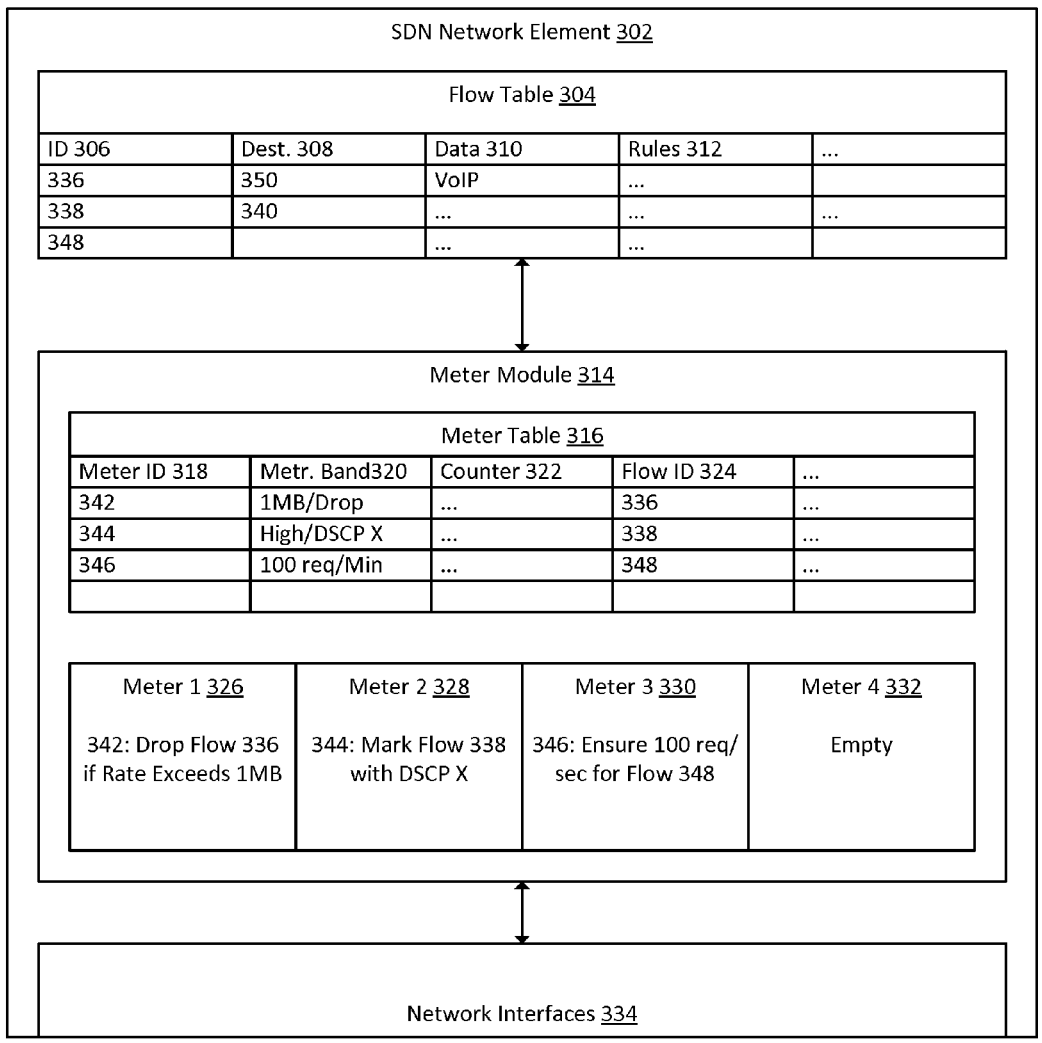
FIG. 3 is a block diagram illustrating an exemplary SDN network element 302 according to an embodiment of the invention.

FIG. 3 is a block diagram illustrating an exemplary SDN network element 302 according to an embodiment of the invention. In some embodiments, the network element 302 is the same as the network elements 112, 120, and 130, however, the network element in this system does not need to be configured as network element 302 is configured in order to provide the functionality of the system described here.

The SDN network element 302 includes a meter module 314 which includes a meter table 316 and meters 326-332. The meter module 314 receives installation messages (depicted as rate limit distribution 162 in FIG. 1) from the SDN controller (e.g. controller 152) and installs meter entries into the meter table 316 according to these messages. In an embodiment, each installation message includes information to install one meter entry based on one rate limit request from a network destination. In other embodiments, each installation message includes information to install one or more (or all) of the meter entries for that network element. In yet another embodiment, an installation message includes only some of the information needed to install or update one or more meter entries.

In an embodiment, a meter entry includes a meter ID 318, a meter band 320, a counter 322, and a flow ID 324. The meter ID 318 represents the ID number of that particular entry. The meter band 320 represents a traffic rate information upon which the associated meter acts. The counter 322 represents a counter for the number of packets processed or other incremental value related to the flow associated with the meter entry. The flow ID 324 identifies the flow associated with the meter entry.

The meter band 320 may provide a variety of instructions to the meter which implements the meter entry associated with that meter band. In an embodiment, the meter band marks the packets in a flow with a particular differentiated services code point (DSCP) entry. For example, as depicted, meter 328 is configured by entry 344 to mark traffic in flow 338, which is destined for network destination 350 (as depicted in the flow table 304) and includes VoIP data, with a DSCP mark of "X." In another embodiment, the meter band 320 instructs the meter to drop the packets associated with the flow matching an entry if it exceeds a certain rate. For example, meter 326 is instructed by entry 342 to drop packets in flow 336 if the traffic rate exceeds 1 MB/sec. In yet another embodiment, a meter band 320 instructs a meter to ensure a minimum traffic rate. For example, meter 330 is instructed by the meter band entry in meter entry 346 to ensure a minimum of 100 requests/second for flow 348. If this rate is unable to be sustained due to other traffic, the other traffic is dropped. The instructions which the meter band provides are not limited to those in the examples provided, and may provide other instructions related to metering traffic.

In some embodiments, each network element has a limited capacity for meters. In the example depicted, network element 302 can support four total meter entries, with three meter entries filled. Meter 332 is empty and can receive a new meter entry. In practice, a network element may have a very large amount of available meter entries and meters. However, as more meter entries are used, the network element must devote more overhead and resources to the maintenance and use of meters.

Although as depicted the meter module 314 uses a meter table and separate meters, in other embodiments of the invention the network element 302 can control the traffic in the flows using other means. For example, the network element 302 may be configured to directly read the meter table for each packet that arrives at the network element and determine what action to take directly from the information in the meter entry. In this way, functionality is not split into parallel meter processes (e.g., meters 326-32), but is processed in serial by the network element.

In an embodiment, the network element 302 also includes a flow table 304 having entries for all the flows (e.g. flows 336, 338, and 348) traversing through the network element. In some embodiments, this flow table has flow entries which each contain a flow ID 306, destination identifier 308, data type 310, and one or more forwarding rules for the flow 312. In an embodiment, a flow entry represents the entire throughput of data arriving at a network element. In an embodiment, the rules 312 instruct the network element on how to forward the packets identified to be part of the respective flow. The information in the flow table is provided to the network element by the SDN controller 152.

The network element 302 also includes network interfaces 334 that may function as ingress or egress ports for the network element 302.

FIG. 4 illustrates a procedure 400 for an exemplary metering configuring 250 executed by the meter distribution assignment module 218 in the SDN controller 152 and on the hardware platform 236 or directly by the SDN controller 152 according to an embodiment of the invention.

At 404, the SDN controller 152 begins to loop through a process for all flows within the network. At 408, for each flow f in the network, the SDN controller 152 determines which network elements (i.e., switches) that particular flow f traverses through, or which network elements "cover" that flow. This set of network elements is denoted as $S^f$. For example, if data/traffic from flow a enters and exits network elements A, B, and C in the network, then, then the set of network elements for flow a, i.e. flow a's $S^f$, would be network elements A, B, and C. At 410, the SDN controller 152 further loops through each network element s in $S^f$, and at 412, for each one of these network elements, a covering count for that network element, denoted by $C_s$, is incremented. Thus, upon the completion of the loop started at 404, $C_s$ represents the number of flows traversing through a network element s. For example, if data/traffic from flows a, b, and c enter and exit through network element A, and these were the only flows traversing network element A, then the covering count, or $C_s$, for network element A would be 3. At 414, the inner for loop ends. At 416, for each flow f, the total number of network elements which the flow traverses is calculated by the SDN controller 152 and is denoted by $|S^f|$. Using the above example, network elements A, B, and C are in $S^f$ for flow a, and thus $|S^f|$ for flow a would be 3.

At 420, the SDN controller 152 sorts the flows by their network element covering count, i.e. $|S^f|$, in ascending order. This new list of sorted flows is stored in SF. In such a list, for example, a flow that traverses only one network element would be placed in the beginning of the list, and a flow that traverses two network elements would be placed after the flow that traverses the one network element, etc. If two flows traverse the same number of network elements, then in an embodiment, these two flows are sorted based on a priority indicator or other heuristic.

At 422, the SDN controller 152 loops through the sorted flows (i.e., SF). Thus, flows with lower $|S^f|$ values are processed before those with higher $|S^f|$ values. Since fewer network elements can meter flows with lower $|S^f|$ values, processing these flows first reduces the danger that these flows will not have a network element to be assigned to.

At 424, an inner loop is initiated to loop upon each network element within $S^f$ for the particular flow in question. At 426, the network element with largest $N_s-C_s$ is selected and is denoted as s', where $N_s$ represents a number denoting the number of empty meter entries remaining for that network element s, i.e. the remaining meter capacity for network element s. At 428, the loop ends and the particular s' has been selected. Using the above example, flow a traverses network elements A, B, and C. Network element A has a remaining capacity of 10 and a covering count of 5, while both network elements B and C have remaining capacities of 5 and covering counts of 4. In such a case, network element A would be selected as the s' for flow a as its $N_s-C_s$ value is larger than the other two network elements. In some cases, the $N_s-C_s$ value is the same for two network elements in the switch covering set $S^f$ for a flow f. In some embodiments, in such a scenario, a priority list or other heuristic determines which network element is selected as s'.

At 430, the current flow being processed, flow f, is assigned to selected network element s'. Network element s' thus installs a meter entry for flow f according to a rate limit entry for that flow. The goal of this selection is to assign flows to network elements that the flow traverses having the largest remaining number meter entry slots as well the smallest covering set. At 432, the remaining meter empty meter slots for the selected network element is decremented by one. At 434, the loop ends and all assignments have been made.

Note that although the procedure is described above using certain keywords, variables, and various forms of data structures, the SDN controller 152 need not execute the procedure using these specific variables or data structures. The SDN controller 152 may execute the procedure using any combination of variables or structures that yield an analogous result. Furthermore, although the above procedure is described in relation to an SDN, it should be understood that it can be applied to any set of network elements in any type of network.

Figure 5A:
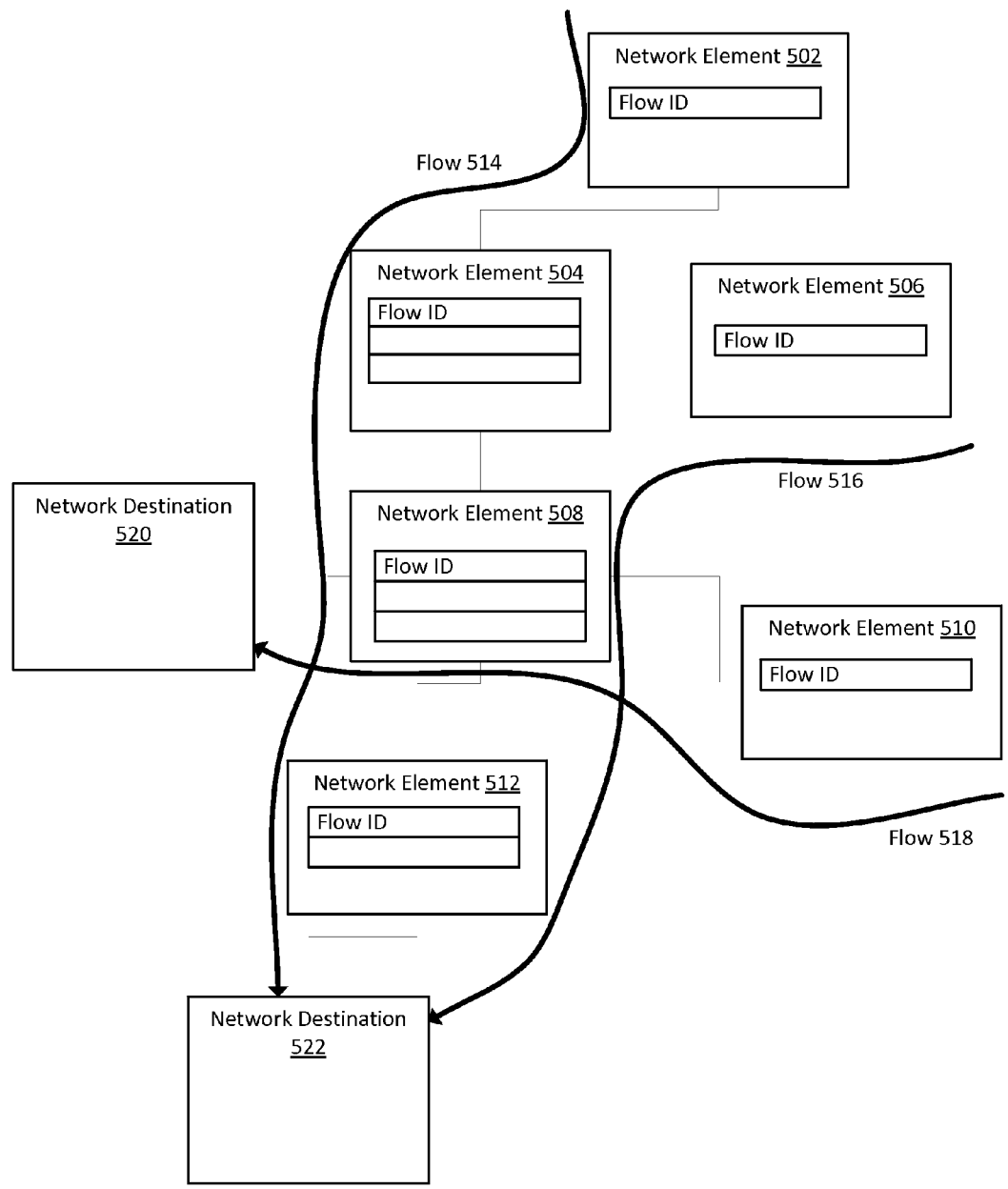
FIG. 5A is a block network diagram illustrating the metering configuration procedure of FIG. 4 in an exemplary network having two network destinations and six network elements according to an embodiment of the invention.

FIGS. 5A-5E are block network diagrams illustrating the metering configuration procedure of FIG. 4 in an exemplary network having two network destinations and six network elements. FIG. 5A illustrates an initial state before meter entries are assigned. Network elements 502, 506, and 510 have no meter capacity (i.e., empty meter entry slots) although flows 514, 516, and 518 traverse through them. Network elements 504, 508, and 512 have 2, 2, and 1 remaining empty meter entries, respectively. Flow 514 traverses network elements 502, 504, 508, and 512 to arrive at network destination 522. Flow 516 traverses network elements 506, 504, 508, and 512 to arrive at network destination 522. Flow 516 shares network elements 504, 508, and 512 with flow 514. Flow 518 traverses network elements 510 and network elements 508 to arrive at network destination 520. Flow 518 shares network element 508 with the other two flows.

Figure 5B:
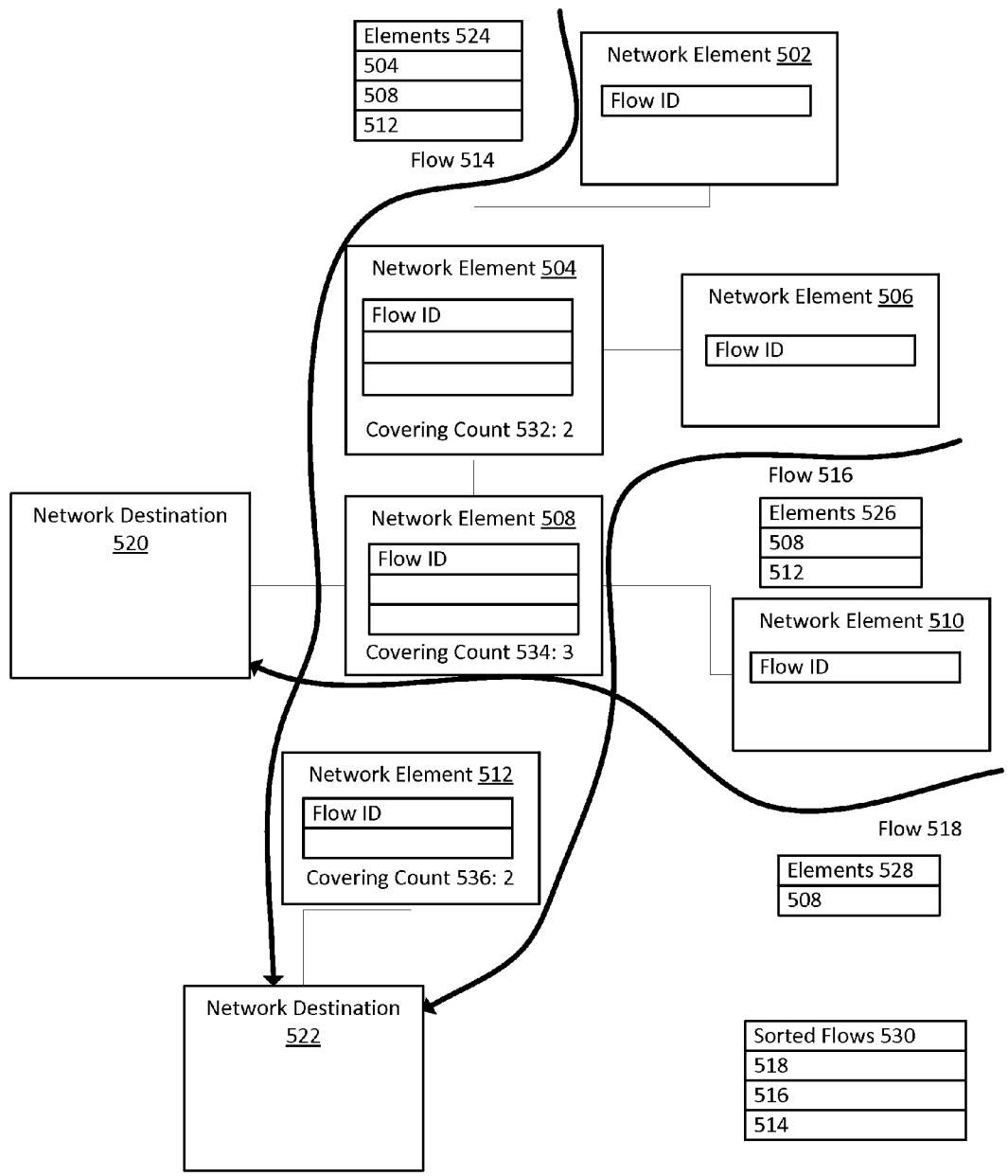
FIG. 5B is a block network diagram illustrating the start of the metering configuration procedure of FIG. 4 in the exemplary network of FIG. 5A according to an embodiment of the invention.

FIG. 5B depicts a state corresponding to 420 in FIG. 4. Flow 514 has as its $S^f$ the network elements listed in 524, i.e. 504, 508, and 512. Flow 516 has its $S^f$ listed in 526, and flow 518 has its $S^f$ listed in 528. Each network element with remaining capacity has a covering count $C_s$ calculated. Network element 504 has flows 514 and 516 traversing through it and thus its covering count 532 is 2. Network element 508 has a covering count 534 of 3 and network element 512 has a covering count 536 of 2. Furthermore, the flows have been sorted according to their $|S^f|$, or number of network elements that can cover them, which is listed as sorted flows 530. These flows are sorted by ascending order of covering network elements from 518 to 516 to 514 as listed. This is because flow 518 has one network element covering it (as shown in 528), and flow 516 has 2, and flow 514 has 3.

Figure 5C:
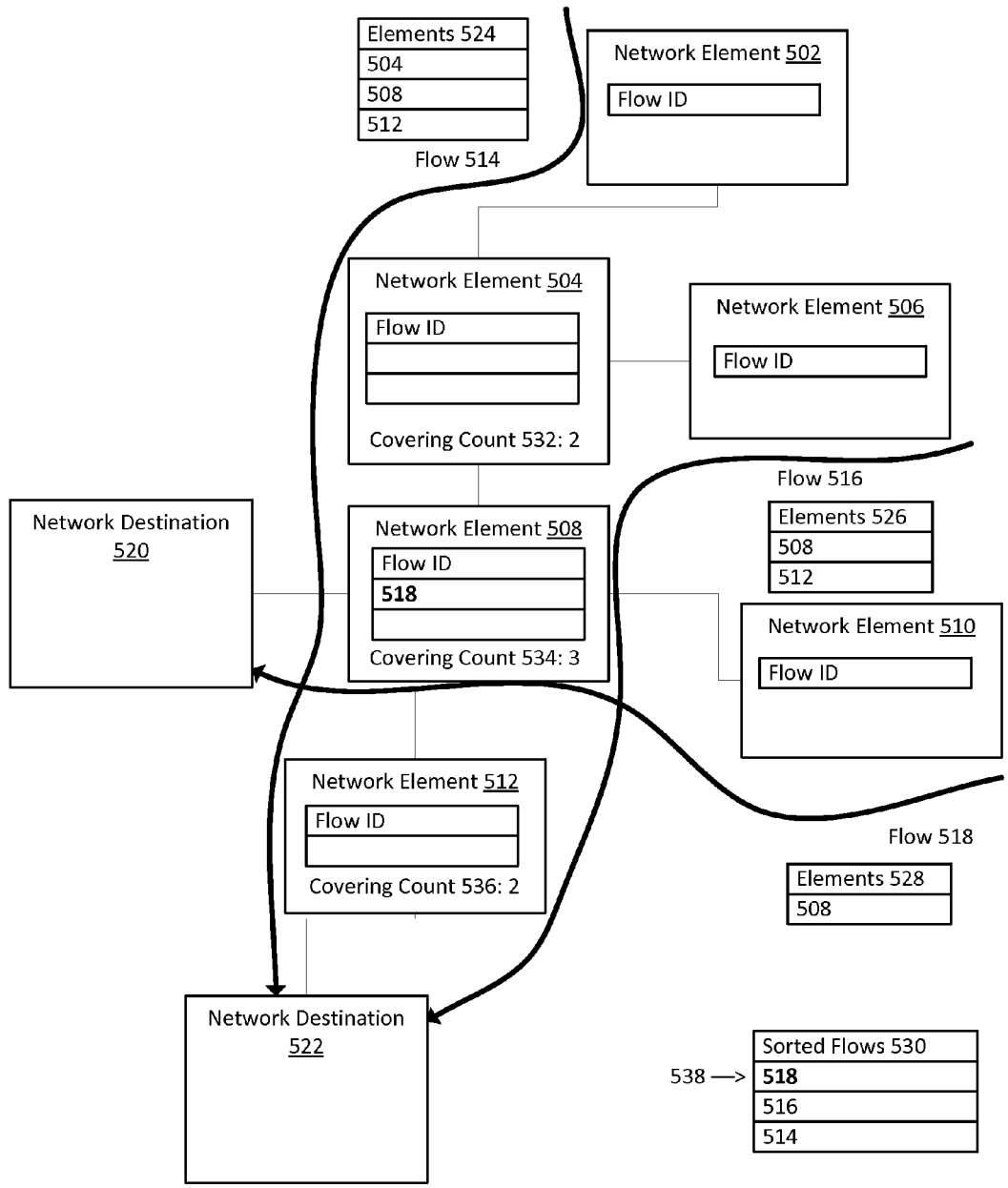
FIG. 5C is a block network diagram illustrating an iteration of a portion of the metering configuration procedure of FIG. 4 in the exemplary network of FIG. 5A according to an embodiment of the invention.

FIG. 5C depicts a state corresponding to 432 after one iteration of the loop which starts at 422. The marker 538 indicates the flow being processed during this iteration. This flow is 518. According to the process illustrated in FIG. 4, for flow 518, the SDN controller 152 determines which network element has the largest remaining meter capacity minus the covering capacity, i.e. the largest $N_s-C_s$ value in the set of network elements covering flow 518. Since network element 508 is the only network element with remaining capacity that can cover flow 518, flow 518 is assigned to network element 508.

Figure 5D:
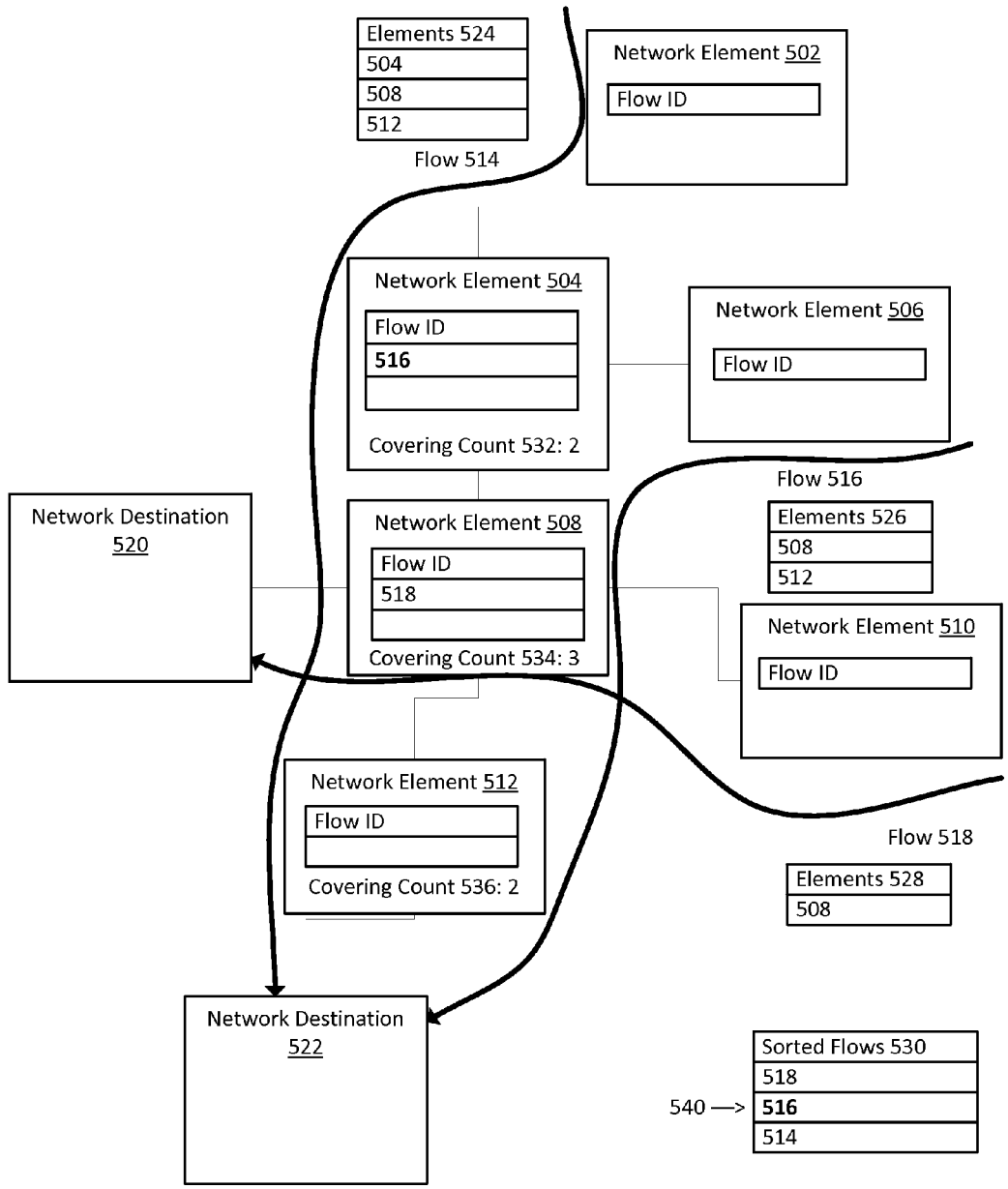
FIG. 5D is a block network diagram illustrating a second iteration of a portion of the metering configuration procedure of FIG. 4 in the exemplary network of FIG. 5A according to an embodiment of the invention.

FIG. 5D depicts a state corresponding to 432 after a second iteration of the loop which starts at 422. The marker 540 indicates that flow 516 is being processed during this iteration by the SDN controller. According to the process illustrated in FIG. 4, for flow 516, out of the network elements which can cover flow 516, the SDN controller determines that network element 504 is the appropriate network element to cover flow 516 as network element 504 has a $N_s-C_s$ value of 2-2=0, while the value for network element 508 is 1-3=-2, and the value for network element 512 is 1-2=-1.

Figure 5E:
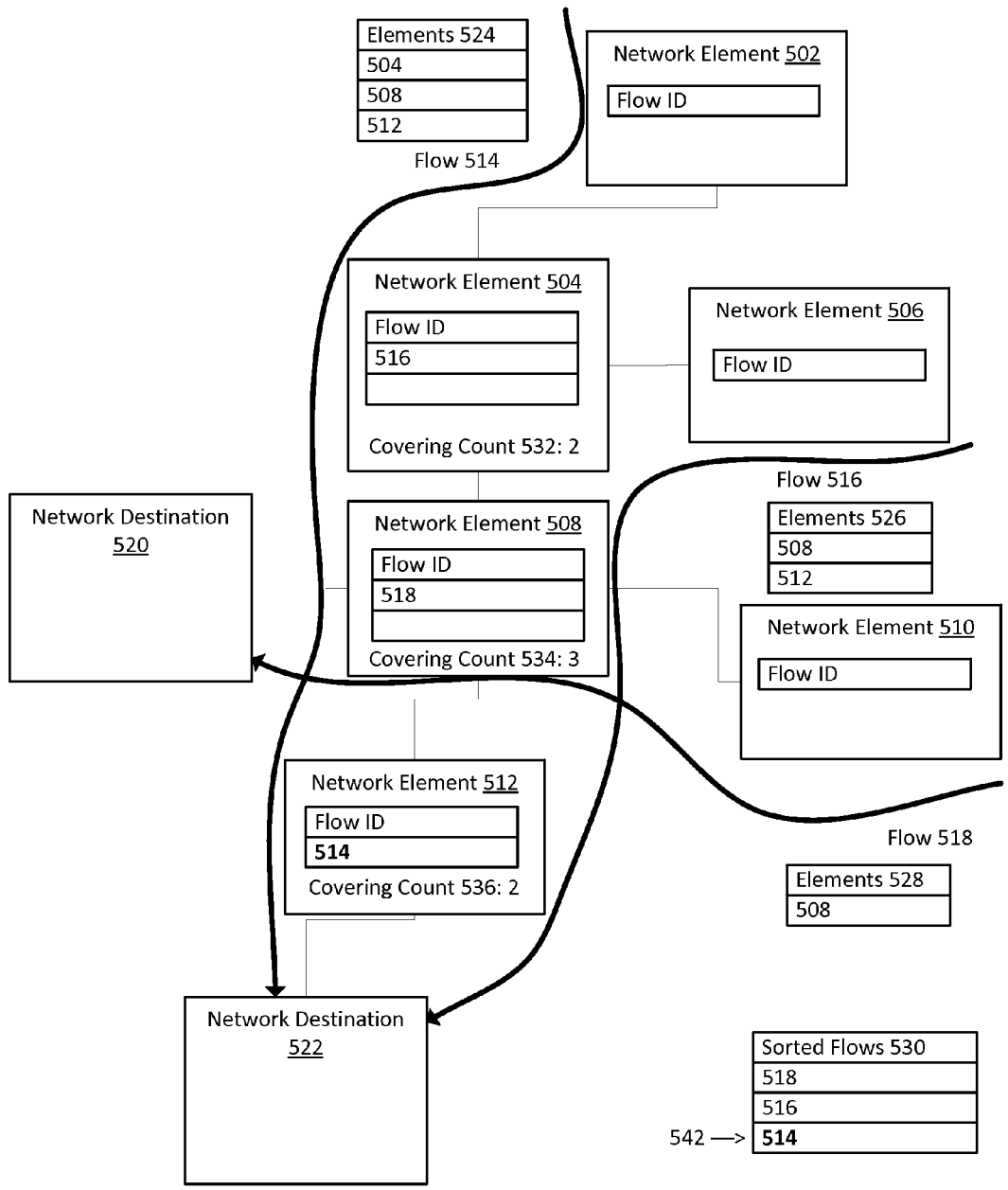
FIG. 5E is a block network diagram illustrating a third iteration of a portion the metering configuration procedure of FIG. 4 in the exemplary network of FIG. 5A according to an embodiment of the invention.

FIG. 5E depicts a state corresponding to 432 after the final iteration of the loop which starts at 422 for this particular network. The marker 542 indicates that flow 514 is being processed during this iteration by the SDN controller 152. According to the process illustrated in FIG. 4, for flow 514, the SDN controller determines that network element 504 has an $N_s-C_s$ value of 1-2=-1, while the value for network element 508 is 1-3=-2, and the value for network element 504 is 1-2=-1. In this case, there is a tie between two of the network elements that can cover the particular flow. In such a case, some type of tiebreaker, priority system, or heuristic is used to determine which network element meters the flow in question. In the depicted embodiment, in the event of a tie, the flow is assigned to the network element with the least number of assigned meters. Thus, network element 512 is assigned flow 514, and flow 514 is placed in the meter table for network element 512. Note that while this tiebreaker is depicted in Fig. E, the process is not limited to only this type, and may utilize other methods to break a tie, such as selecting the network element with the largest remaining meter capacity, or the network element with the smallest covering count, or a combination of any of these above.

Figure 6:
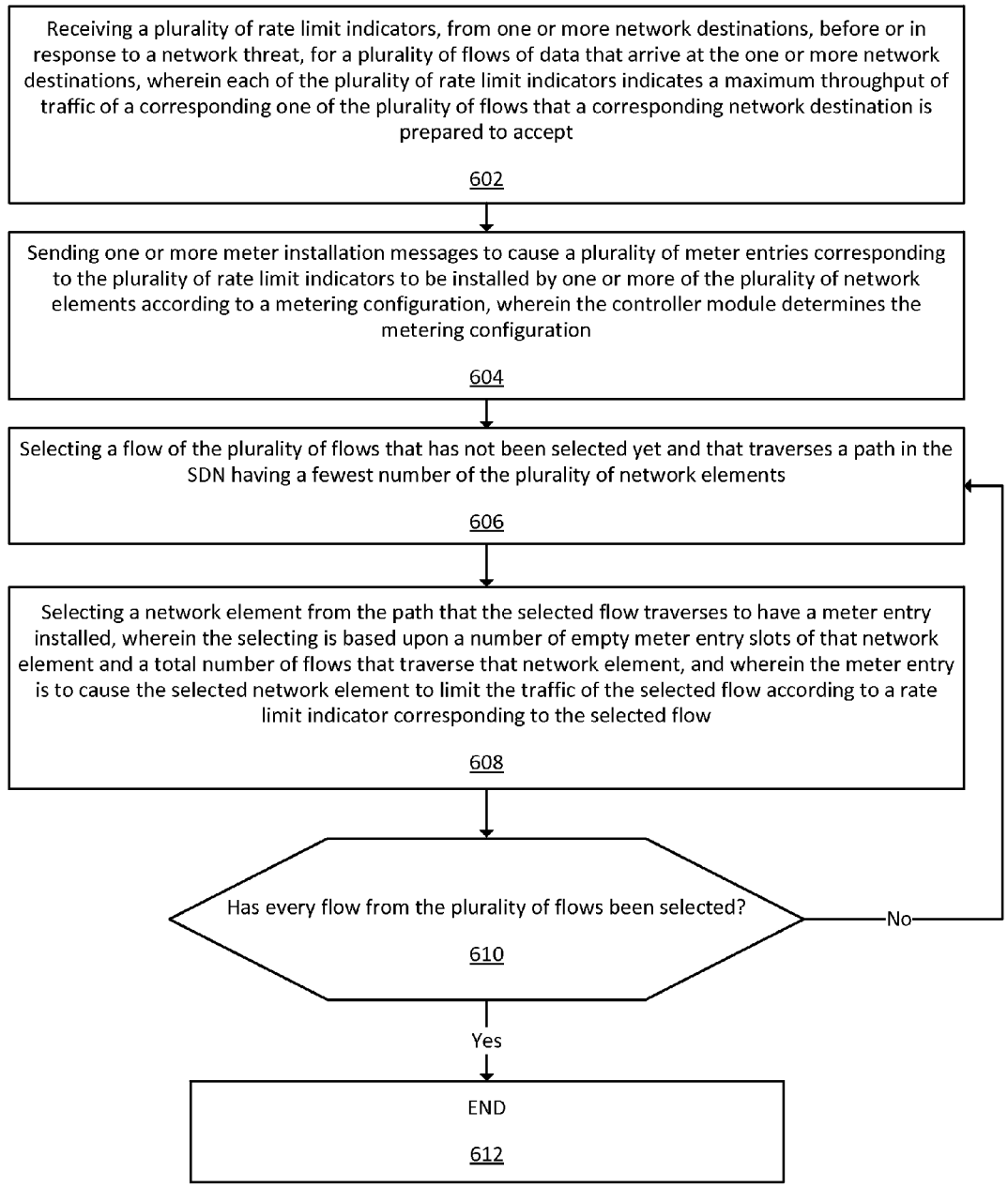
FIG. 6 is a flow diagram illustrating an exemplary process flow on the SDN controller 152 according to an embodiment of the invention.

FIG. 6 is a flow diagram illustrating an exemplary process flow on the SDN controller 152 according to an embodiment of the invention. The operations in this flow diagram will be described with reference to the exemplary embodiments of the other figures. However, it should be understood that the operations of this flow diagram can be performed by embodiments of the invention other than those discussed with reference to the other figures, and the embodiments of the invention discussed with reference to these other figures can perform operations different than those discussed with reference to this flow diagram.

At 602, the SDN controller 152 receives a plurality of rate limit indicators (e.g. 160), from one or more network destinations (e.g. 136, 144, etc.), for a plurality of flows of data that arrive at the one or more network destinations (e.g. flow 126, 128, 110, etc.), wherein each of the plurality of rate limit indicators indicates a maximum throughput of traffic of a corresponding one of the plurality of flows that a corresponding network destination is prepared to accept.

In some embodiments, the SDN controller 152 receives the plurality of rate limit indicators from the one or more network destinations before a network threat occurs. In some embodiments, the SDN controller 152 receives the plurality of rate limit indicators from the one or more network destinations occurs in response to a network threat perceived by the one or more network destinations. In an embodiment, one of the plurality of rate limit indicators is for a single flow that corresponds to an entire throughput of data arriving at a single network destination.

At 604, the SDN controller 152 sends one or more meter installation messages (e.g., in rate limit distribution 162) to cause a plurality of meter entries (e.g. 342, 344) corresponding to the plurality of rate limit indicators to be installed by one or more of the plurality of network elements according to a metering configuration (e.g. 250), wherein the controller module determines the metering configuration.

At 606, the SDN controller 152 executes the metering configuration by selecting a flow of the plurality of flows that has not been selected yet and that traverses a path in the SDN having a fewest number of the plurality of network elements.

At 608, the SDN controller 152 further executes the metering configuration by selecting a network element from the path that the selected flow traverses to have a meter entry installed, wherein the selecting is based upon a number of empty meter entry slots of that network element and a total number of flows that traverse that network element, and wherein the meter entry is to cause the selected network element to limit the traffic of the selected flow according to a rate limit indicator corresponding to the selected flow. In some embodiments, the network element with the highest result from subtracting the number of flows that traverse that forwarding element from the number of empty meter slots of that forwarding element is selected. In an embodiment, the selecting the network element comprises selecting the network element that has the highest result from subtracting the number of flows that traverse that network element from the number of empty meter slots of that network element.

In some embodiments, the meter entry causes the one of the plurality of network elements on which the meter entry is installed on to drop incoming data for a corresponding one of the plurality of flows when data throughput in the corresponding one of the plurality of flows exceeds the maximum throughput of traffic indicated by the rate limit indicator.

At 610, the SDN controller 152 determines if every flow from the plurality of flows has been selected/processed. If not, execution proceeds to 606 to repeat the process for remaining flows. When all flows have been processed, execution ends at 612.

Although the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a controller module stored in a non-transitory machine-readable storage medium of a computing device for allocating rate-limiting meters to a plurality of network elements of a software defined network (SDN), wherein the controller module when executed by the computing device acts as a controller of the SDN, the method comprising:

receiving a plurality of rate limit indicators, from one or more network destinations, for a plurality of flows of data that arrive at the one or more network destinations, wherein each of the plurality of rate limit indicators indicates a maximum throughput of traffic of a corresponding one of the plurality of flows that a corresponding network destination is prepared to accept; and sending one or more meter installation messages to cause a plurality of meter entries corresponding to the plurality of rate limit indicators to be installed by one or more of the plurality of network elements according to a metering configuration, wherein the controller module determines the metering configuration by, for each of the plurality of flows, selecting a flow of the plurality of flows that has not been selected yet and that traverses a path in the SDN having a fewest number of the plurality of network elements, and selecting a network element from the path that the selected flow traverses to have a meter entry installed, wherein the selecting is based upon a number of empty meter entry slots of that network element and a total number of flows that traverse that network element, and wherein the meter entry is to cause the selected network element to limit the traffic of the selected flow according to a rate limit indicator corresponding to the selected flow.

2. The method of claim 1, wherein the selecting the network element comprises selecting the network element that has the highest result from subtracting the number of flows that traverse that network element from the number of empty meter slots of that network element.

3. The method of claim 1, wherein receiving the plurality of rate limit indicators from the one or more network destinations occurs before a network threat occurs.

4. The method of claim 1, wherein receiving the plurality of rate limit indicators from the one or more network destinations occurs in response to a network threat perceived by the one or more network destinations.

5. The method of claim 1, wherein one of the plurality of rate limit indicators is for a single flow that corresponds to an entire throughput of data arriving at a single network destination.

6. The method of claim 1, wherein the meter entry causes the one of the plurality of network elements on which the meter entry is installed on to drop incoming data for a corresponding one of the plurality of flows when data throughput in the corresponding one of the plurality of flows exceeds the maximum throughput of traffic indicated by the rate limit indicator.

7. An apparatus to be coupled to a plurality of network elements of a software defined network (SDN) and configured to allocate rate-limiting meters to the plurality of network elements, the apparatus comprising:
a processor; and
a non-transitory machine-readable storage medium having stored thereon an SND controller, which when executed by the processor, causes the apparatus to include,
a policy store to store a plurality of rate limit indicators for a plurality flows of data to be received from one or more network destinations in the SDN, wherein each of the plurality of rate limit indicators indicates a maximum throughput of traffic of a corresponding one of the plurality of flows that a corresponding network destination is prepared to accept; and
a meter entry distribution module to send one or more meter installation messages to cause one or more of the plurality of network elements to install a plurality of meter entries corresponding to the plurality of rate limit indicators in accordance with a metering configuration, wherein to determine the metering configuration, for each of the plurality of flows, the meter entry distribution module is configured to,
select a flow of the plurality of flows that has not been selected yet and that traverses a path in the SDN having a fewest number of the plurality of network elements, and
select a network element from the path that the selected flow traverses to have a meter entry installed, wherein the selection is based upon a number of empty meter entry slots of that network element and a total number of flows that traverse that network element, and wherein the meter entry is to cause the selected network element to limit the traffic of the selected flow according to a rate limit indicator corresponding to the selected flow.

8. The apparatus of claim 7, wherein the meter entry distribution module is configured to select the network element by selecting the network element that has the highest result from a subtraction of the number of flows that traverse that network element from the number of empty meter slots of that network element.

9. The apparatus of claim 7, wherein the policy store is configured to receive the plurality of rate limit indicators before a network threat occurs.

10. The apparatus of claim 7, wherein the policy store is configured to receive the plurality of rate limit indicators in response to a network threat perceived by one of the one or more network destinations.

11. The apparatus of claim 7, wherein one of the plurality of rate limit indicators is for a single flow that corresponds to an entire throughput of data arriving at a single network destination.

12. The apparatus of claim 7, wherein the meter entry causes the one of the plurality of network elements on which the meter entry is installed on to drop incoming data for a corresponding one of the plurality of flows when data throughput in the corresponding one of the plurality of flows exceeds the maximum throughput of traffic indicated by the rate limit indicator.

13. A system, comprising:
a plurality of network elements of a software defined network (SDN), each one of the plurality of network elements including,
a flow table that stores one or more rules governing one or more flows traversing the one of the plurality of network elements, and
a meter module including,
a meter table that stores one or more meter entries each including a rate limit indicator, wherein each rate limit indicator indicates a maximum throughput of traffic that a corresponding network destination is prepared to accept for a corresponding one of the one or more flows traversing through the one of the plurality of network elements, and wherein the meter table has a limited capacity to store meter entries, and
one or more meters corresponding to the one or more meter entries in the meter table, wherein each meter limits the throughput of traffic of a corresponding flow according to the rate limit indicator of the corresponding meter entry; and
a controller module stored on a non-transitory machine-readable storage medium of a computing device coupled to the plurality of network elements in the SDN that allocates rate-limiting meters to the plurality of network elements in the SDN, wherein the computing device executes the controller module, the controller module including,
a policy store that stores a plurality of rate limit indicators for a plurality of flows that are received from one or more network destinations in the SDN; and
a meter entry distribution module that sends one or more meter installation messages to cause one or more of the plurality of network elements to install a plurality of meter entries corresponding to the plurality of rate limit indicators in accordance with a metering configuration, wherein to determine the metering configuration, for each of the plurality of flows, the meter entry distribution module,
selects a flow of the plurality of flows that has not been selected yet and that traverses a path in the SDN having a fewest number of the plurality of network elements, and
selects a network element from the path that the selected flow traverses to have a meter entry installed, wherein the selecting is based upon a number of empty meter entry slots of that network element and a total number of flows that traverse that network element, and wherein the meter entry is to cause the selected network element to limit the traffic of the selected flow according to the rate limit indicator corresponding to the selected flow.

14. The system of claim 13, wherein the meter entry distribution module selects the network element by selecting the network element that has the highest result from a subtraction of the number of flows that traverse that network element from the number of empty meter slots of that network element.

15. The system of claim 13, wherein the policy store receives the plurality of rate limit indicators before a network threat occurs.

16. The system of claim 13, wherein the policy store receives the plurality of rate limit indicators in response to a network threat perceived by one of the one or more network destinations.

17. The system of claim 13, wherein one of the plurality of rate limit indicators is for a single flow that corresponds to an entire throughput of data arriving at a single network destination.

18. The system of claim 13, wherein each meter entry causes the one of the plurality of network elements on which the meter entry is installed on to drop incoming data for a corresponding one of the plurality of flows when data throughput in the corresponding one of the plurality of flows exceeds the maximum throughput of traffic indicated by the rate limit indicator.

19. The system of claim 13, wherein each meter entry comprises at least one of a meter identifier (ID), a meter band, and a counter, wherein the meter band includes the rate limit indicator and at least one of a drop indicator and a Differentiated Services Code Point (DSCP) remark, wherein the counter tracks a number of packets processed by the meter associated with the meter entry, and wherein the drop indicator indicates to the corresponding meter to drop data from the flow when the traffic throughput of the flow exceeds the maximum throughput of traffic indicated by the rate limit indicator.

20. The system of claim 13, wherein the policy store further comprises one or more policy store entries, and wherein each policy store entry includes at least one of:
- a victim identifier (ID) corresponding to one of the one or more network destinations;
- a data type of one of a set of flows destined for the one of the one or more network destinations;
- the rate limit indicator corresponding to the one of the set of flows;
- a time period indicator to indicate when the rate limit indicated in the rate limit indicator should be active; and
- a meter ID.

21. The system of claim 20, wherein the meter entry distribution module further comprises a meter assignment storage table to indicate that one of the plurality of network elements that is assigned one of the plurality of meter entries, and wherein each meter entry is identified by the meter ID.

* * * * *

UNITED STATES PATENT AND TRADEMARK OFFICE
CERTIFICATE OF CORRECTION

PATENT NO. : 9,172,651 B2
APPLICATION NO. : 14/181347
DATED : October 27, 2015
INVENTOR(S) : Zhang et al.

It is certified that error appears in the above-identified patent and that said Letters Patent is hereby corrected as shown below:

On the Title Page, in Item (74), under "Attorney, Agent, or Firm", in Column 2, Line 2, delete "Elliot," and insert -- Elliott, --, therefor.

Specification

In Column 8, Line 66, delete "requests 162" and insert -- requests 160 --, therefor.

In Column 12, Line 49, delete "flow 312." and insert -- flow 304. --, therefor.

Claims

In Column 17, Line 22, in Claim 7, delete "the" and insert -- the SDN controller --, therefor.

In Column 17, Line 25, in Claim 7, delete "an SND" and insert -- an SDN --, therefor.

Signed and Sealed this
Sixteenth Day of August, 2016

Michelle K. Lee
*Director of the United States Patent and Trademark Office*